Aug. 17, 1965  H. T. DOUGHTY  3,200,550
NAILABLE ASSEMBLY
Filed Feb. 29, 1960  2 Sheets-Sheet 1

INVENTOR.
HARTWELL T. DOUGHTY, Deceased
By KATHRYN B. DOUGHTY, Executrix
By Shanley & O'Neil
ATTORNEYS Aug. 17, 1965    H. T. DOUGHTY    3,200,550
NAILABLE ASSEMBLY
Filed Feb. 29, 1960    2 Sheets-Sheet 2
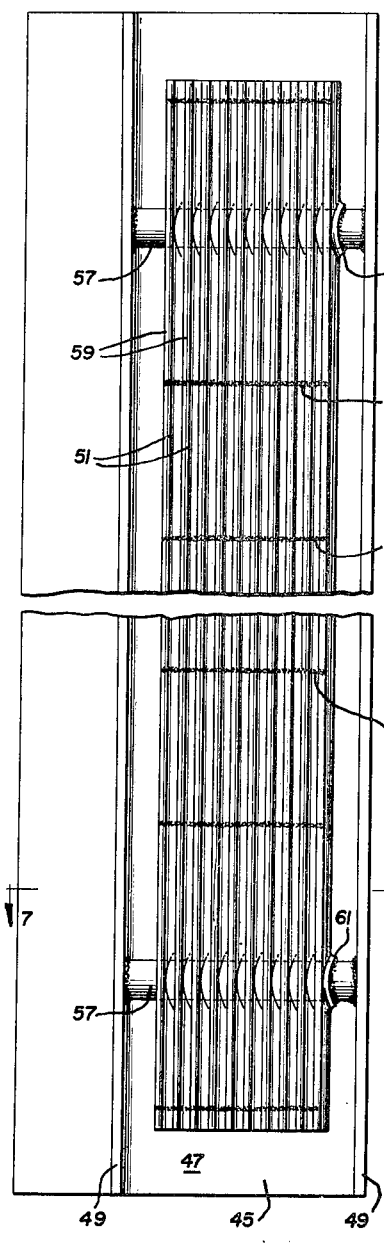
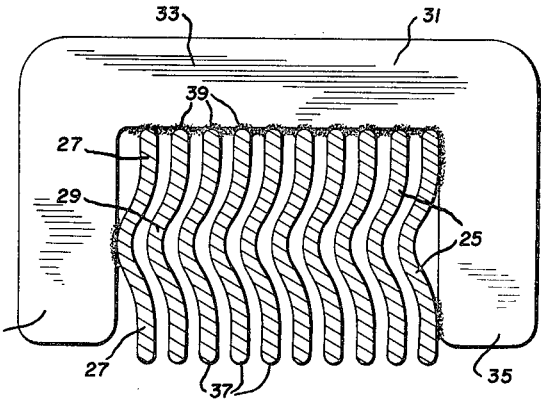
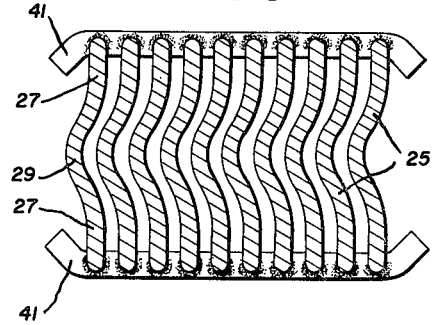
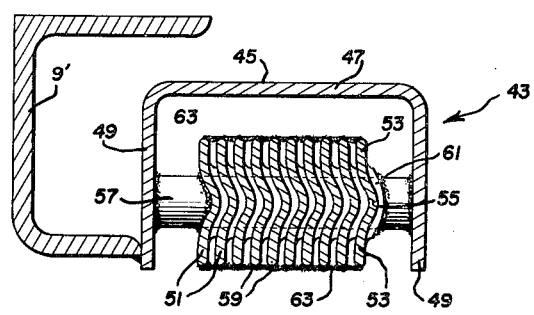
INVENTOR.
HARTWELL T. DOUGHTY, Deceased
By  KATHRYN B. DOUGHTY, Executrix
By  Shanley & O'Neil
ATTORNEYS United States Patent Office 3,200,550
Patented Aug. 17, 1965

3,200,550
NAILABLE ASSEMBLY
Hartwell T. Doughty, deceased, by Kathryn B. Doughty, executrix, Livonia, Mich, assignor to National Steel Corporation, a corporation of Delaware
Filed Feb. 29, 1960, Ser. No. 11,649
7 Claims. (Cl. 52—377)

The present invention relates to improvements in metal structural members and units including such structural members which may be incorporated in freight conveyances, for the purpose of repeatedly receiving and removably retaining nails driven therein.

In the transportation of freight, it is a common practice to fill each end of a freight car with package freight to the desired level and then place a barricade across the freight car to hold the freight in each end in position. These barricades are frequently placed on opposite sides of the doorways and extend across the freight car with each end of a barricade being held in place by heavy sections of lumber nailed to the wooden sides of the car adjacent the doorway on each side of the car. It is also a common practice, when transporting loose freight such as wheat or other grain, to cover the doorways to prevent the freight from spilling out through the doorways. In this latter case, boards or other material such as heavy paper are placed across each doorway and fastened to the car by means of nails driven through the boards into the side walls of the car adjacent both sides of the doorway to form a barricade. A large number of nails are used for fastening and holding in place such barricades for package or bulk freight, and these nails are concentrated in the side walls of the car adjacent the doorway. After the freight reaches its destination, the barricades must be removed; and the tearing loose of these nails causes excessive damage to the wooden side walls. Often, this damage is so great that at times a new car after one trip will have to be repaired at a cost of $100.00 or more. At best, the side walls have to be repaired after a relatively short period of use when freight requiring barricades is handled.

More recently, it has been proposed that freight cars be provided with metal floors and walls by arranging metal structural members side by side on the floor and walls with the structural members so constructed as to provide sinuous slots therebetween into which nails can be driven and removably gripped. While such metal walls and floors are a distinct improvement, they do not overcome the problem that there are many freight cars in existence having wooden linings on the interior of the side walls. These freight cars cannot economically be discarded, so that the repair of the side walls in such cars is a continuing important economic problem. In addition, the cost of the more recent type of freight cars having floors and walls lined with metal structural members presenting nailing slots is greater than the cost of the previous construction including wooden lining.

Accordingly, it is an object of the present invention to provide improved nailable assemblies that can readily be included in freight cars.

Another object of the present invention is the provision of improved nailable assemblies than can be readily assembled in a box car or other freight conveyance at the side of the doorway of the conveyance and so constructed that barricades may be fastened in place with nails without damage to the conveyance.

Still another object of the present invention is the provision of an improved unit of assembled metal structural members that can be readily installed in new or old conveyances such as freight cars to provide a metal nailable structure where the use of nails is concentrated.

Finally, it is an object of the present invention to provide a nailable assembly which will be relatively easy and inexpensive to manufacture and to install and utilize, and which will be rugged and durable in use.

Other objects and advantages of the present invention will become apparent from a consideration of the following description, taken in connection with the accompanying drawings, in which:

FIGURE 4 is a section on the line 4—4 of FIGURE 3;

FIGURE 5 is a section on the line 5—5 of FIGURE 3;

FIGURE 6 is an elevational view, with parts broken away, of a modified form of a nailable assembly according the present invention; and FIGURE 7 is a cross-sectional view on the line 7—7 of FIGURE 6.

Figure 3:
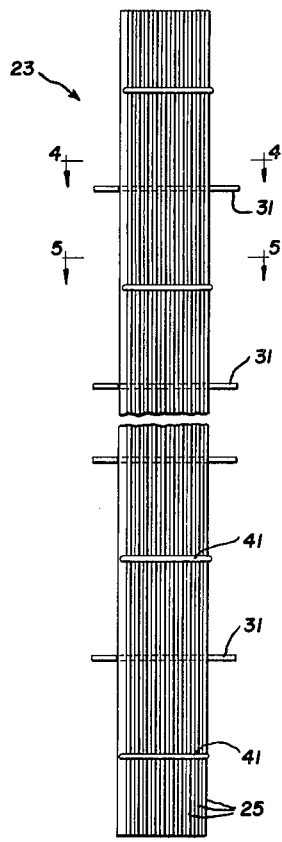
FIGURE 3 is an elevational view, with parts broken away, of a nailable assembly according to a preferred form of the present invention.
Figure 1:
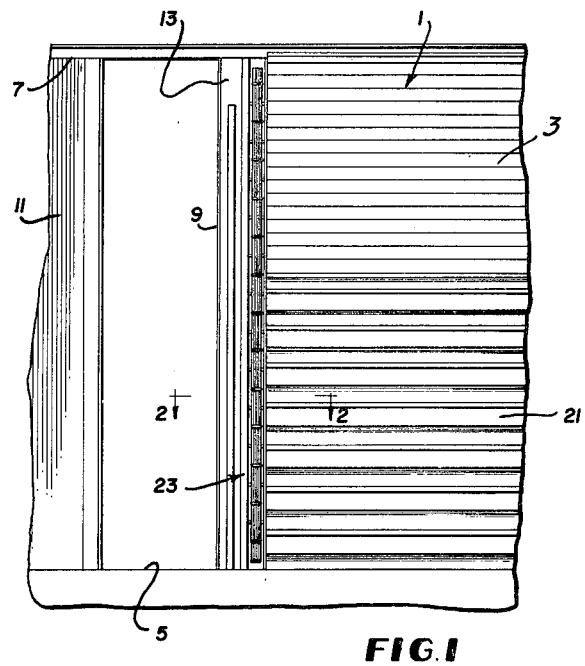
FIGURE 1 is a fragmentary elevational view of a side of the interior of a freight car having structure according to the present invention, with the car door, partly open.

Referring now to the drawings in greater detail, there is shown a freight car indicated generally at 1 including a side wall 3 through which there passes a door opening defined by a floor 5, an upper sill 7 and a pair of doorposts 9, only one of which is shown. A door 11 is disposed between doorposts 9 (only one of which is shown) in the usual manner.

The structure peculiar to the present invention is shown installed in connection with and closely adjacent a doorpost 9; and for purposes of simplicity, only one of the pair of assemblies according to the present invention will be illustrated, the illustrated assembly being disposed to the right of the door as viewed from the interior of the freight car. It will also be understood that the novel structure of the present invention can be located in other positions about the freight car. Accordingly, there is provided a housing 13 extending generally from the floor to the roof of the car and secured at its edge adjacent the door as by welding to doorpost 9. Housing 13 is bent at its other end in the form of an inwardly opening channel portion 15 providing an elongated vertically extending recess communicating with the interior of the freight car. At that bent end of the housing, the housing is welded to a housing support 17 which in turn is secured along its outer edge to outer side wall sheathing 19 and on its inner side to inner side wall lining 21 of wood or corrugated sheet metal or combinations of both or the like.

The preferred form of nailable assembly according to the present invention, indicated generally at 23, is comprised of a plurality of elongated strips 25 disposed generally parallel to each other and having portions comprising most of the strips spaced apart from each other a distance equal to about the thickness of an individual strip. Each strip 25 has a pair of longitudinal side edge portions 27 that are flat and coplanar and an intermediate portion 29 which is displaced from that plane a distance equal to about the distance between the spaced portions of the strips. Accordingly, the intermediate portions 29 of all but one strip will be so displaced that the leading surface of the displaced intermediate portion 29 will touch the plane of the adjacent flat surfaces of portions 27 of the immediately adjacent strip 25 toward which it is displaced.

Strips 25 are held in rigid assembly with each other and with the freight car by means of a plurality of U-shaped brackets 31, each of which comprises a U-shaped member having a mid-portion 33 and an inwardly extending leg 35 at either end thereof, both legs 35 extending in the same direction from mid-portion 33. Brackets 31 embrace strips 25 on three sides thereof, thereby to leave a plurality of straight parallel edges 37 of the strips exposed to the interior of the freight car, the opposite longitudinally extending edges 39 of the strips being each welded to each bracket 31, the brackets 31 in turn conforming to the contour of and being welded to the interior of the inwardly opening recessed portion 15 of housing 13, so that brackets 31 also provide means securing the strips 25 in rigid assembly with the freight car. In the illustrated embodiment, nailable assemblies 23 are disposed vertically with the common vertical plane of exposed edges 37 extending lengthwise of the freight car. Thus, there is a plurality of brackets 31 each of which is horizontally disposed and all of which are vertically spaced apart lengthwise of the recessed portion 15 of housing 13. Of course, it is not necessary that this nailable assembly be always disposed vertically, since it can be used in other positions on other portions of the freight car.

Disposed about midway between adjacent brackets 31 are strip ties 41 each of which comprises a short bar having a point of contact with each edge 37 or 39 of each strip 25. The ends of strip ties 41 are bent in at an oblique angle so as to minimize damage to freight, and damage to other equipment when moving the nailable assemblies. There is a pair of strip ties 41 on each side of the nailable assembly at each position midway between brackets 31, so that there is a pair of strip ties at each of a plurality of levels. The purpose of the strip ties is to augment the action of brackets 31 along edges 39 and to perform the function of maintaining edges 37 properly spaced apart on the opposite side of the nailable assembly.

A somewhat modified arrangement of the present invention is shown in FIGURES 6 and 7, in which a nailable assembly 43 is rigidly secured to a U-shaped bracket comprising an elongated channel 45 which provides a U-shaped member having a mid-portion 47 and a pair of legs 49 functionally corresponding to legs 35 of brackets 31 but different in that there is only one mid-portion and only two legs for each nailable assembly of this modified form. As before, a plurality of strips 51 is provided having longitudinal side edge portions 53 that are flat and coplanar and intermediate portions 55 displaced from portions 53 a distance about equal to the thickness of the material. A plurality of short pins 57 extends between and is fixed at each end to legs 49 therebetween. In the illustrated embodiment, pins 57 are horizontal and parallel and vertically superposed. Each pin 57 passes through each strip 51. As before, a plurality of parallel vertically disposed edges 59 of strips 51 are exposed to the interior of the car and lie in a common vertical plane, but the corresponding opposite edges are free rather than being secured to the U-shaped member. Also, in this latter embodiment, the spacing of the strips is not maintained by strip ties but rather by flanges 61 which surround the holes through which pins 57 extend through strips 51, so that the flange 61 of one strip touches the immediately adjacent strip thereby to maintain between the strips the desired spacing of about the thickness of a strip. These flanges 61 may be formed during stamping of the holes through the strips or during the deformation of the strips to provide intermediate portions 55. In any event, the stack of strips 51 on the pins 57 thus spaced apart by flanges 61 is welded to the pins to provide rigid interconnection between the strips and the U-shaped member provided by channel 45, which in turn is rigidly secured as by welding to the freight car.

Figure 2:
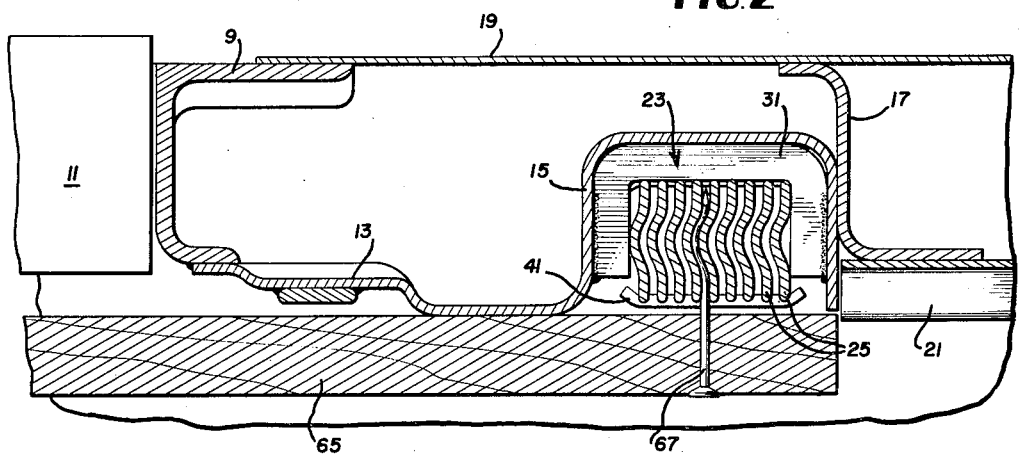
FIGURE 2 is an enlarged fragmentary cross-sectional view on the line 2—2 of FIGURE 1 but with the car door closed.

In operation, as best seen in FIGURE 2, a board 65 or the like is placed across the nailable assembly, then a nail 67 is driven through the board and into the nailable assembly between adjacent strips 25. It is very important to note that the end of the nail which penetrates between the strips is actually deformed so that it cannot be removed without again deforming it. The nail is thus effectively clinched simply by passing between strips 25 and particularly between intermediate portions 29 thereof.

The clinching action of the present invention can be obtained by driving the nails anywhere into the assembly of strips. With regard to all of the strips but the end strips of the stack of strips, one side of the strip is as good as another for the purpose of clinching the nails. Hence, it is not necessary to take careful aim so as to hit a nailing slot. Moreover, as the exposed edges 37 are rounded, it is hardly possible to strike these edges with the tip of a nail in such a way as to prevent further nailing.

The present invention is not to be confused with nailable assemblies in which the strips are movable relative to each other and spring-urged together into a pack with no space therebetween. It is known to provide such assemblies that are expansible upon the introduction of a nail between adjacent strips thereby to space the strips apart, and it is also known to make the individual strips thereof with corrugations. However, the corrugations of these prior art arrangements do not clinch the nails as in the present invention. Instead, they merely seek to provide a frictional grip between the strips and the nails. This frictional grip, however, is not nearly as effective nor as efficient as the clinching action of the present invention for purposes of retaining the nails in the nailable assembly against undesired dislodgement.

In view of all of the foregoing disclosure, it will be obvious that all of the initially recited objects of the present invention have been achieved.

It is to be understood that the appended claims are to be accorded a range of equivalents commensurate in scope with the advance made over the prior art.

What is claimed is:

1. A nailable assembly comprising a rigid and inextensible U-shaped member having a midportion terminating on either side in a pair of legs both of which extend away from said midportion in the same direction, and a plurality of elongated parallel strips each of a depth perpendicular to its length at least several times its thickness, means fixedly secured to each strip and fixedly securing the strips in rigid spaced-apart assembly with each other, a longitudinal side edge of at least a plurality of said strips being welded to said midportion of the U-shaped member to secure the strips in rigid assembly with the U-shaped member and to dispose the strips between the legs of the U-shaped member, each strip being spaced from the next adjacent strips to provide a plurality of nailing slots between the strips and extending full depth of the strips for the reception and retention of nails in the spaces between the strips, the depth of the strips perpendicular to their length and the distance between immediately adjacent strips being such that the slots between the strips are of a depth at least several times their width, the strips having complementary corrugations therein extending lengthwise thereof for deforming and retaining nails driven into said slots between said strips.

2. A nailable assembly as claimed in claim 1, each stirp having an exposed outer edge that is rounded.

3. A nailable assembly as claimed in claim 1, said means fixedly secured to each strip comprising a bar affixed to an exposed outer edge of the each strip.

4. A nailable assembly as claimed in claim 3, each strip having an exposed outer edge that is rounded.

5. A nailable assembly as claimed in claim 1, comprising a plurality of said U-shaped members spaced along the length of said strips.

6. A nailable assembly as claimed in claim 5, said means fixedly secured to each strip comprising a plurality of bars spaced along the length of each strip, each bar being affixed to an exposed outer edge of each strip.

7. A nailable assembly as claimed in claim 6, each strip having an exposed outer edge that is rounded.

References Cited by the Examiner

UNITED STATES PATENTS

| | | | |
|---|---|---|---|
| 1,798,197 | 3/31 | Eichner | 189—34 X |
| 2,727,595 | 12/55 | Beltman | 189—34 |
| 2,900,055 | 8/59 | Shaver | 189—34 |
| 3,052,292 | 9/62 | Bruning | 189—34 X |

RICHARD W. COOKE, Jr., *Primary Examiner.*

JAMES S. SHANK, LEO QUACKENBUSH, JOEL REZNEK, JACOB L. NACKENOFF, *Examiners.*